United States Patent [19]
Pahl

[11] Patent Number: 5,481,869
[45] Date of Patent: Jan. 9, 1996

[54] TWO STAGE PRESSURIZATION SYSTEM FOR AEROSPACE APPLICATIONS

[75] Inventor: Donald A. Pahl, Woodinville, Wash.

[73] Assignee: Olin Corporation, Redmond, Wash.

[21] Appl. No.: 261,365

[22] Filed: Jun. 16, 1994

Related U.S. Application Data

[63] Continuation-in-part of Ser. No. 132,734, Oct. 6, 1993.

[51] Int. Cl.⁶ .................................................. F02K 9/50
[52] U.S. Cl. .......................................... 60/259; 60/39.48
[58] Field of Search ........................... 60/240, 257, 259, 60/39.48, 39.462, 734

[56] References Cited

U.S. PATENT DOCUMENTS

| | | |
|---|---|---|
| 2,732,657 | 1/1956 | Krautkramer . |
| 3,009,316 | 11/1961 | McKinley . |
| 3,049,832 | 8/1962 | Joffe . |
| 3,098,353 | 7/1963 | Abild ........................................ 60/259 |
| 3,132,977 | 5/1964 | Knight . |
| 3,140,582 | 7/1964 | Tyson, Jr. . |
| 3,257,799 | 6/1966 | Goalwin . |
| 3,336,750 | 8/1967 | Beckmann . |
| 3,427,806 | 2/1969 | Truax ........................................ 60/259 |
| 3,517,508 | 6/1970 | Newman et al. . |
| 3,545,068 | 12/1970 | Bowles . |
| 3,672,165 | 6/1972 | Baum . |
| 4,132,165 | 1/1979 | Leeson ................................... 60/39.48 |
| 4,279,269 | 7/1981 | Schink et al. . |
| 4,305,247 | 12/1981 | Ellion et al. . |
| 4,470,258 | 9/1984 | Steenborg . |
| 4,656,828 | 4/1987 | Bingley et al. . |
| 4,867,195 | 9/1989 | Blewett et al. . |
| 4,901,525 | 2/1990 | Beveridge et al. . |
| 4,926,632 | 5/1990 | Smith et al. . |
| 4,946,522 | 8/1990 | Liedtke et al. . |
| 5,027,596 | 7/1991 | Steenborg . |

*Primary Examiner*—Louis J. Casaregola
*Attorney, Agent, or Firm*—Gregory S. Rosenblatt

[57] ABSTRACT

There is provided a two-stage system for expelling a liquid fuel component from a main fuel tank to a rocket engine. A pressurized high vapor pressure liquid combined with the vapor of that liquid expel a desired volume of a gas forming liquid from a first stage fuel tank. A gas generator converts this liquid to a gas that expels a desired quantity of fuel from the main fuel tank. The two-stage system is at an equilibrium pressure. The only active control required for the system is a controller to meter the flow of fuel from the main fuel tank to the engine. The pressure drop in the system resulting from the discharge of fuel causes the high vapor pressure liquid to partially evaporate charging more gas into the system until equilibrium is achieved again.

15 Claims, 13 Drawing Sheets

PRIOR ART

_FIG-8

_FIG-9

TWO STAGE PRESSURIZATION SYSTEM FOR AEROSPACE APPLICATIONS

CROSS REFERENCE TO RELATED APPLICATION

This patent application is a continuation in part of U.S. patent application Ser. No. 08/132,734 entitled "Pressurization and Control Devices Using High Vapor Pressure Liquids" by Donald A. Pahl, filed Oct. 6, 1993.

BACKGROUND OF THE INVENTION

This invention relates to pressurization systems for space craft and missiles. More particularly, a compressed high vapor pressure liquid pressurizes a propellant feed system or functions as a reference pressure for a control device.

The propellant expulsion system of a liquid fuel engine constitutes a significant portion of the weight and cost of that engine. The propellant expulsion system includes a storage chamber for the propellant, a mechanism for feeding the propellant to a combustion chamber and a means to introduce the propellant into the chamber. The liquid propellant is stored in containers and fed to the combustion chamber either by a pressurized gas or by a displacement piston or centrifugal pump.

U.S. Pat. Nos. 3,009,361 to McKinley and 3,672,165 to Baum, disclose the use of a pressurized inert gas, typically helium, to expel a liquid propellant to a combustion chamber. A large volume of highly pressurized gas is required to expel an effective volume of propellant. The pressurized gas is stored in thick walled metallic containers until required. These containers occupy a significant portion of the available space within the rocket and contribute a significant weight penalty.

Another method for feeding liquid propellant to a combustion chamber is disclosed in U.S. Pat. No. 4,901,525 to Beveridge et al. The patent discloses delivering pressurized liquid propellant to a turbo pump. The propellant is then combined with a small amount of liquid oxidant and ignited to drive the turbo pump. The turbo pump then delivers a propellant rich liquid to the combustion chamber at high pressure. This method avoids the necessity of thick walled tanks to store a pressurized expulsion gas, but the large number of turbo pumps increases the cost and complexity of the delivery system.

There exists, therefore, a need for a liquid propellant delivery system which does not suffer from the weight, space and complexity problems of the prior art systems.

SUMMARY OF THE INVENTION

Accordingly, it is an object of the invention to provide a propellant expulsion system for delivering liquid propellant to a rocket engine which reduces the amount of space and weight required to store the propellant expulsion means. It is the feature of the invention that at least a portion of the propellant expulsion means is a high vapor pressure liquid. Yet another feature of the invention is that the high vapor pressure liquid provides a constant pressure reference source which is useful to control the rate of propellant and oxidizer flow to the engine.

It is an advantage of the invention that the volume of compressed high vapor pressure liquid which expels a desired volume of liquid propellant is significantly less than the volume of a compressed gas required to expel a similar volume of propellant. As the result, the propellant expulsion means occupies a smaller volume, reducing the weight of the delivery system or increasing the amount of propellant which may be carried. Yet another advantage of the invention is that the compressed high vapor pressure liquid has a constant pressure at a given temperature and is used as a reference to control the feed of propellant and oxidizer to the engine. This reduces the number of electronic sensors and controllers required to operate the engine, reducing the cost and complexity of the engine and reducing the likelihood of failure.

In accordance with the invention, there is provided a two-stage system for delivering a liquid propellant to a combustion reactor. The system includes a first vessel containing a fluid maintained at a first pressure, a second vessel containing a gas forming liquid and a third vessel containing a second liquid propellant. A first conduit delivers the fluid to the second stage vessel and where the fluid displace at least a portion of the gas forming liquid. A second conduit delivers the gas forming liquid to a gas generator. The generated pressurized gas displaces at least a portion of the liquid propellant in the third vessel. A controller downstream of the third vessel controllably releases the liquid propellant.

The above stated, objects, features and advantages will become more apparent from the specification and drawings which follow.

DETAILED DESCRIPTION

Figure 1:
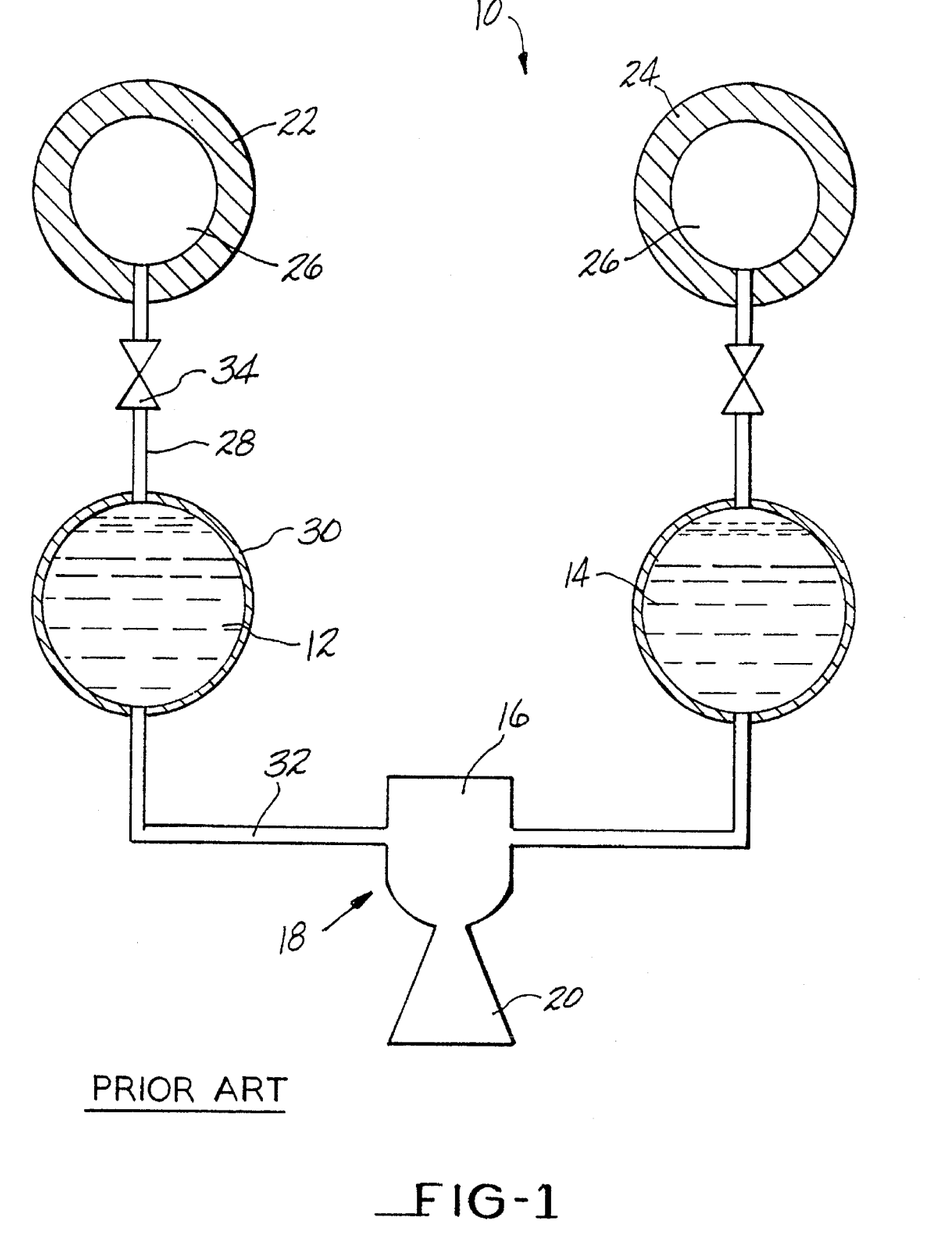
FIG. 1 shows in cross-sectional representation a system for delivering a liquid fuel component to a rocket engine in accordance with the prior art.

FIG. 1 shows in cross-sectional representation a liquid fuel component expulsion system 10 as known from the prior art. The fuel expulsion system 10 is a bi-propellant type having separate liquid propellant 12 and liquid oxidizer 14 sources. The fuel is a mixture of the fuel components. Among the fuel components of a bi-propellant system are the propellant and the oxidizer. The fuel of a mono-propellant system is generally limited to the monopropellant.

Typically, the liquid propellant 12 is hydrazine ($N_2H_4$), kerosine, or another rocket fuel known in the art. One suitable liquid oxidizer 14 is nitrogen tetroxide ($N_2O_4$). When the liquid propellant 12 and liquid oxidizer 14 are combined in the combustion chamber 16 of a rocket engine 18, the liquid propellant is rapidly combusted to reaction exhaust gases which are expelled through nozzle 20 propelling the space ship or missile.

The efficient operation of the rocket engine 18 requires that the combustion chamber 16 be provided with a constant supply of liquid propellant 12 and liquid oxidizer 14 provided in a precise mixture ratio. To exhaust the liquid propellant 12 and liquid oxidizer 14, first 22 and second 24 expulsion tanks are provided. The first 22 and second 24 expulsion tanks are filled with a pressurized gas 26, typically helium or nitrogen. A first conduit 28, typically a stainless steel pipe, delivers the pressurized gas 26 to the liquid propellant tank 30, displacing the liquid propellant 12 at a desired rate. A second conduit 32 delivers the liquid propellant 12 to the combustion chamber 16. A valve 34 which may be mechanically, electrically or pyrotechnically activated, controls the timing and rate of displacement of the liquid propellant 12 by the pressurized gas 26.

In a mono-propellant system, as known from the prior art but not illustrated, the liquid oxidizer tank is absent and the liquid fuel is decomposed to reaction exhaust gases by a catalyst or heat. A conventional mono-propellant expulsion system 10 has a blow down ratio of about 4:1, the volume of pressurized gas 26 required to expel a desire volume of liquid fuel 12 is four times the volume of that liquid fuel when the gas and liquid are at uniform pressure. As a result, the pressurized gas 26 must be highly pressurized, typically on the order of 400 psia, necessitating thick walled metal expulsion tanks. These heavy metal tanks take up a significant amount of space and contribute a significant weight penalty, typically on the order of 10–20 pounds.

Figure 2:
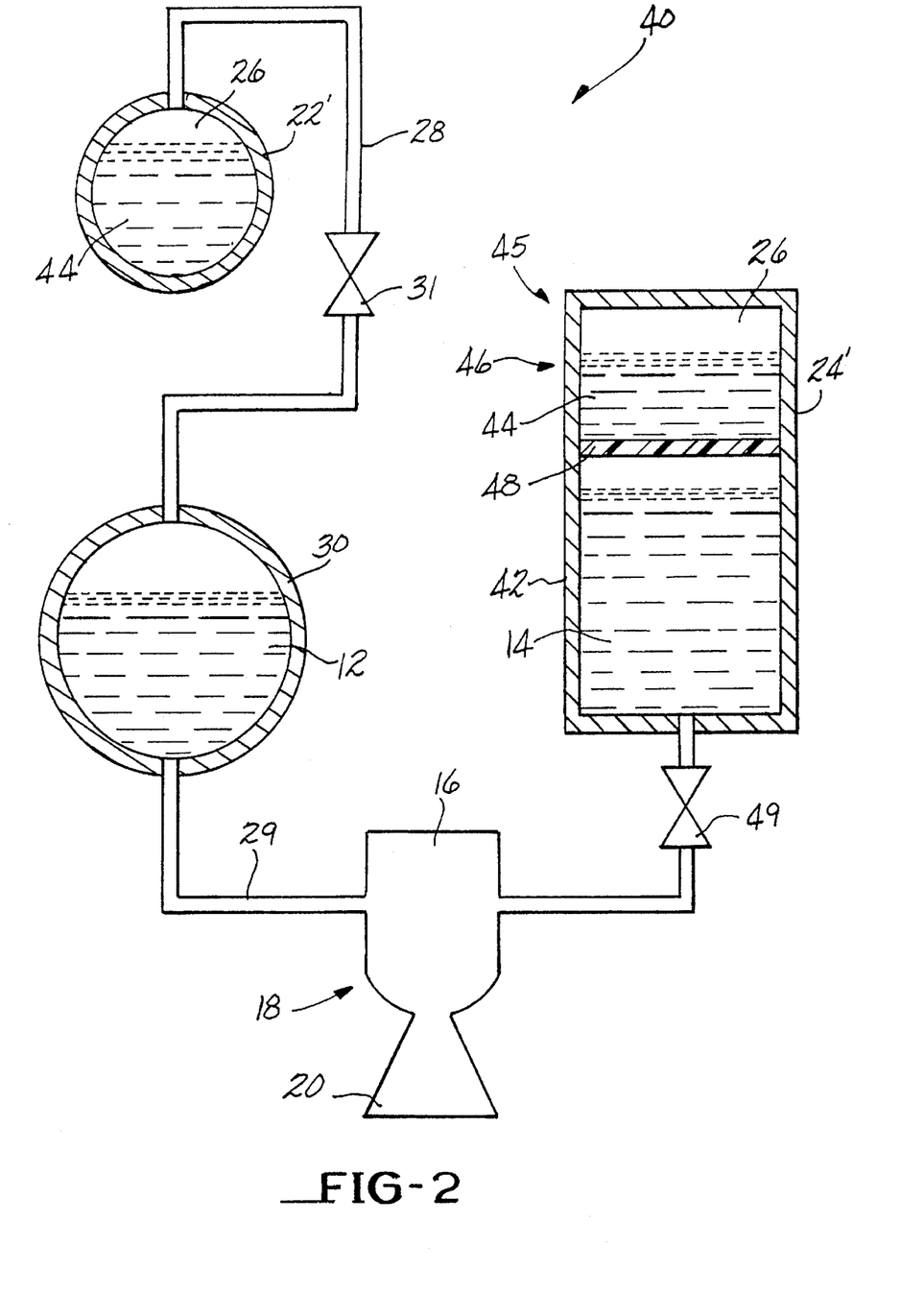
FIG. 2 shows in cross-sectional representation a system for delivering a liquid fuel component to a rocket engine in accordance with an embodiment of the invention.

Applicant's inventive system for delivering a liquid fuel component to a rocket engine, as illustrated in cross-sectional representation in FIG. 2, reduces the volume of pressurized gas required, which either reduces the overall weight of the propellant expulsion system or increases the amount of liquid fuel which can be carried on board. Both options increase the effective range of the space ship or missile.

With reference to FIG. 2, the propellant expulsion system 40 contains some elements similar to those of the prior art and these elements are indicated by like reference numerals. Different elements which perform similar functions to the prior art elements are indicated by primed reference numerals.

While FIG. 2 illustrates the use of a bi-propellant expulsion system, the concepts of the invention are equally applicable to mono-propellant expulsion systems.

The propellant supply system 40 includes a liquid propellant 12 contained in a liquid propellant tank 30. Preferably, the liquid propellant is hydrazine. A liquid oxidizer 14, typically nitrogen tetroxide, is contained in a liquid oxidizer fuel tank 42. The expulsion systems and reference systems of the invention are equally applicable to the "propellant side" and the "oxidizer side" of any such system. The liquid propellant 12 and liquid oxidizer 14 are combined in the combustion chamber 16 of a rocket engine 18 and the reaction product gases exhausted through nozzle 20 to drive the space ship or missile.

The liquid propellant 12 and liquid oxidizer 14 are expelled from the liquid propellant tank 30 and liquid oxidizer tank 42, respectively, by displacement by a pressurized fluid provided from the first 22' and second 24' expulsion tanks. Typically, valve 31 which can be mechanical, electromechanical or pyrotechnic and normally closed determines the ignition timing. An electromechanical, normally closed, valve is preferred. The first 22' and second 24' expulsion tanks contain a pressurized liquid component 44 and, optionally, a pressurized gas component 26. The pressurized liquid component 44 is any suitable high vapor pressure liquid having a vapor pressure at ambient temperature (70° F.) of from about 100 to about 1500 psia. The preferred vapor pressure is from about 130 psia to about 500 psia at ambient. Suitable materials include fluorinated hydrocarbons, ammonia and mixtures thereof. Ammonia is preferred because expulsion of ammonia is less detrimental to the ozone layer and ammonia is highly compatible with the preferred liquid propellant 12, hydrazine. When the preferred fluid is also a liquid, the second liquid can be the same or different than the first liquid.

The gaseous component 26 is any suitable inert gas such as helium, nitrogen or mixtures thereof. The relatively higher density of the pressurized high vapor pressure liquid as compared to the pressurized gas reduces the volume of pressurized fluid required to expel the desired volume of liquid propellant 12. Smaller propellant expulsion tanks 22' and 24' may be utilized, having thinner walls, thereby reducing the space constraints and weight penalty of the propellant supply system. As a result, more liquid fuel 12 and liquid oxidizer 14 may be included in the propellant expulsion system 40, increasing the usefulness of the rocket engine 18.

Either, or both, compressed fluids (liquid or gaseous component) may be transmitted through a first conduit 28 to displace a portion of the liquid propellant 12 into a second conduit 29 for delivery to the combustion chamber 16. The gaseous component, if present, is preferred because it has a lower density. Rather than separate tanks 22', 30 to contain the expulsion means and the liquid fuel component as illustrated on the propellant side of FIG. 2, a single tank 45 may be utilized as illustrated on the oxidizer side of FIG. 2. In the single tank configuration, the first conduit could be a portion of the interior wall of the tank 45.

Either the multiple tank or the single tank expulsion means is suitable for either fuel component of a bipropellant system and for a monopropellant system.

The single tank system has an expulsion portion 46 containing a pressurized high vapor pressure liquid component 44 and, optionally, a pressurized gas component 26. The expulsion portion 46 is separated from the fuel component by a metal or elastomeric piston 48. The piston is any suitably rigid material which does not react with the propellant and expulsion components. For a hydrazine/nitrogen tetroxide system, a preferred material for the piston 48 is stainless steel. When the valve 49, which may be mechanical, electromechanical or pyrotechnic, is opened, the evaporation and expansion of the high vapor pressure liquid component 44 drives the piston to displace the liquid fuel component to the combustion chamber 16.

Figure 3A:
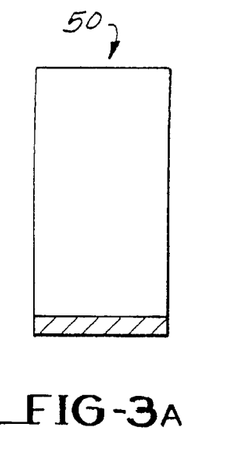
FIG. 3A, 3B and 3C shows in block diagram how the use of a compressed liquid increases the amount of liquid fuel component expelled by the delivery system of the invention.
Figure 3B:
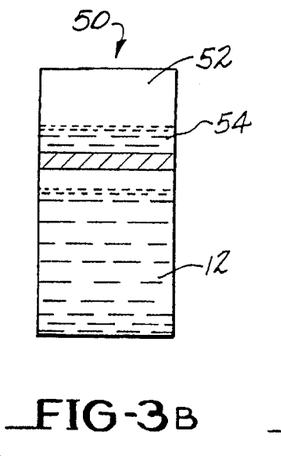
Figure 3C:
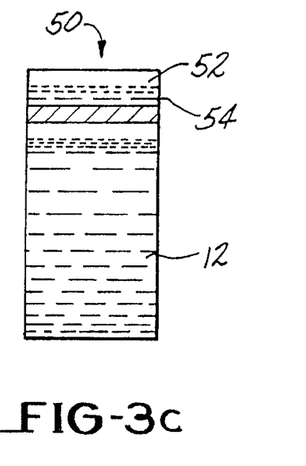
Figure 4:
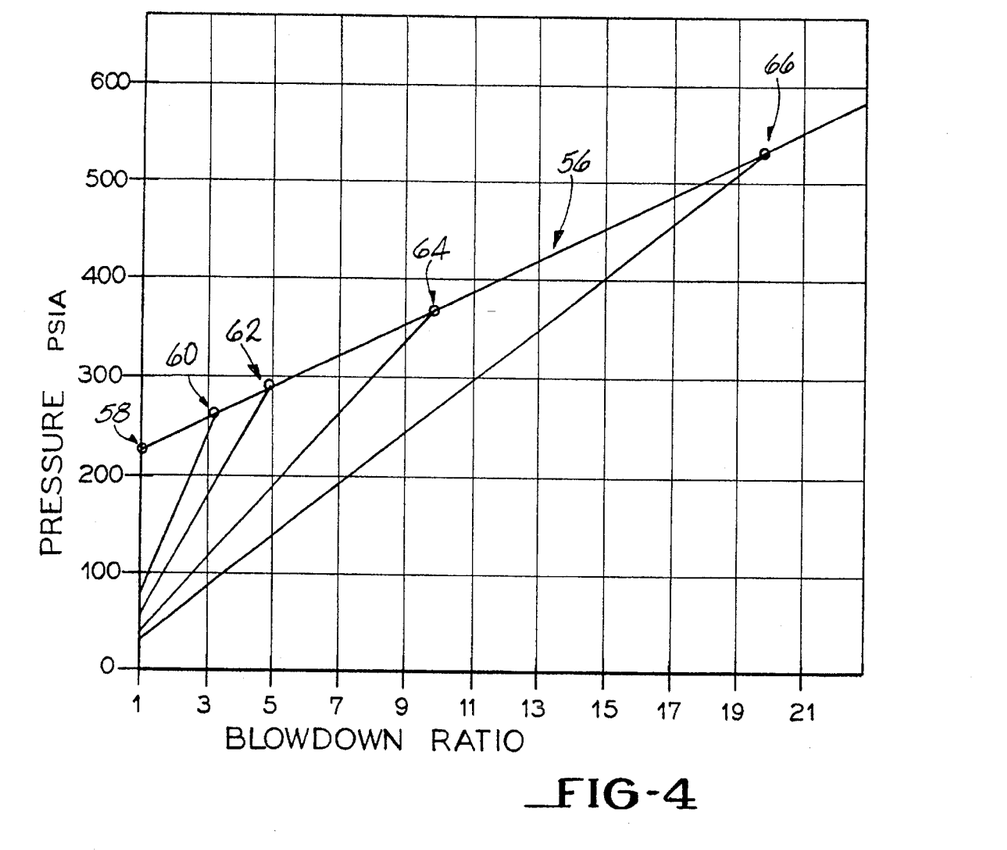
FIG. 4 graphically illustrates the increased pressure ratio achieved for a given blow down ratio using the expulsion system of the invention.

FIGS. 3 and 4 graphically illustrate the benefits of the present invention. In FIG. 3, the effect of a high vapor pressure liquid on the pressure blow down is illustrated. In FIG. 3A, the propellant tank 50 is filled with ammonia vapor to a pressure of 247 psia, at 110° F. the equilibrium point. To this tank, 20 psi of gaseous helium is added for a total pressure of 267 psia. FIG. 3A illustrates a condition before the addition of any liquid fuel, ullage is 100 percent.

When the propellant tank 50 is two thirds filled (ullage= 33.3%) with a liquid fuel 12 as illustrated in FIG. 3B, the pressurized side 52 contains ammonia vapor at the equilibrium pressure at 247 psia and gaseous helium at 60 psia for a total pressure of 307 psia. Since the pressure is greater than the equilibrium pressure of ammonia vapor, pressurized liquid ammonia 54 condenses.

As additional liquid fuel 12 is added so the tank 50 is ⅚ full as illustrated in FIG. 3C (ullage=16.7%), the pressure of the gaseous ammonia remains at the equilibrium point, 247 psia, and the pressure of the gaseous helium increases to 120 psi for a total pressure of 367 psia. The volume of pressurized liquid ammonia 54 also increases. When the liquid fuel 12 is expelled from the propellant tank 50 of FIG. 3C, the 6/1 volume blow down to empty the tank yields a pressure blow down of 367 psia/267 psia or 1.37. This compares quite favorably to a system containing gaseous helium as the only pressurizing agent. In the gas only system, a 6/1 volume blow down requires a 6/1 pressure blow down at constant temperature.

FIG. 4 graphically illustrates the advantage of the propellant expulsion system of the present invention for systems having various blow down ratios at constant temperature. Reference line 56 represents the total pressure in an ammonia augmented blow down system. At 100° F., the equilibrium vapor pressure of ammonia is approximately 232 psia as indicated by reference point 58. At a blow down ratio of approximately 3.2:1, (reference point 60) the total pressure is about 265 psia. The pressure blow down ratio is 265 psia/232 psia=1.14:1. This compares quite favorably to the 3.2:1 pressure blow down ratio of isothermal gaseous helium, as shown by the curve sloping steeply downward from reference point 60.

Table 1 illustrates the pressure blow down improvement for the blow down ratios (reference numerals 60,62,64,66) illustrated in FIG. 4. In each case, the isothermal helium pressure blow down ratio would be equal to the volume blow down ratio.

TABLE 1

| Reference Numeral | Blow down Ratio | Total Pressure (psia) | Pressure Ratio |
|---|---|---|---|
| 60 | 3.2 | 265 | 1.14 |
| 62 | 5 | 290 | 1.25 |
| 64 | 10 | 360 | 1.55 |
| 66 | 20 | 525 | 2.26 |

Figure 5:
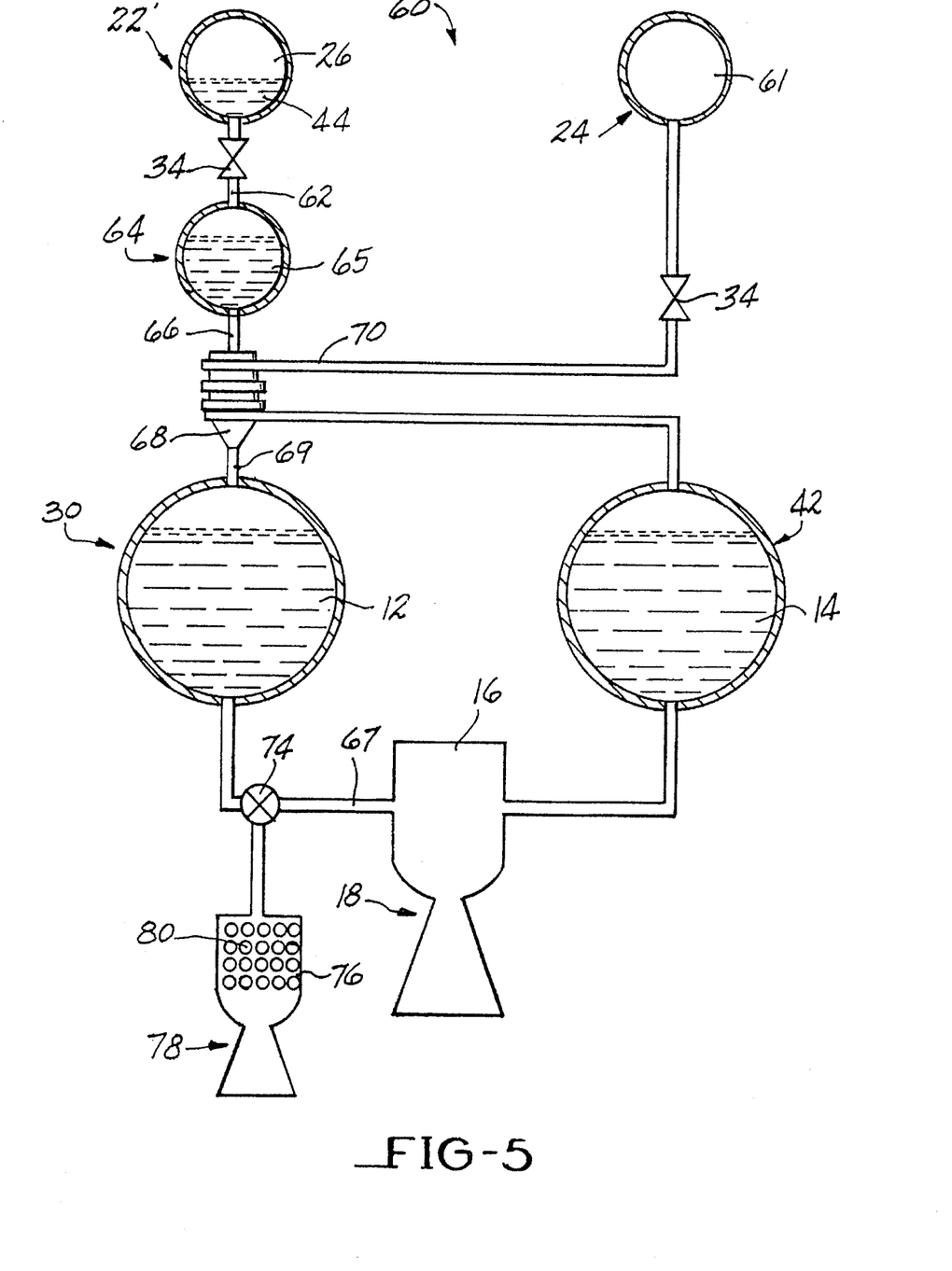
FIG. 5 shows in block diagram a two stage liquid fuel component expulsion system in accordance with an embodiment of the invention.

Improved propellant supply systems are achieved using a hybrid (pressurized liquid/pressurized gas) expulsion system. FIG. 5 shows in block diagram, a propellant supply system 60 in accordance with an embodiment of the invention. The first 22' expulsion tank contains a mixture of a pressurized high vapor pressure liquid 44 and a pressurized fluid 26. Preferably, the pressurized fluid is a first pressurized gas 26. A second 24 expulsion tank contains a second pressurized gas 61.

When valves 34, typically electromechanical and normally closed, are opened, the first expulsion tank 22' communicates its pressure through a first conduit 62 to a primer tank 64. The primer tank contains a quantity of a decomposable liquid 65. The decomposable liquid is preferably in substantial part the same liquid as the propellant fuel component 12, such as hydrazine. The decomposable liquid is delivered through a second conduit 66 to a gas generator 68. The gas generator 68 decomposes the decomposable liquid 65 to reaction exhaust gases typically by a catalytic chemical reaction or thermal decomposition. For hydrazine, a suitable catalyst is alumina impregnated with iridium such as SHELL 405 (trademark of Shell Development Co., Emoryville, Calif.).

The exhaust gases are communicated through a third conduit 69 to the liquid propellant tank 30, displacing a volume of liquid propellant 12 which is delivered by means of a fourth conduit 67 to the combustion chamber 16 of rocket engine 18.

The reaction within the gas generator 68 is exothermic. To reduce the volume of pressurized gas 61 required to displace the liquid oxidizer 14, the pressurized gas is transmitted through a heat exchanger 70, in the form of a coil wrapped around the gas generator 68. The heat transferred from the gas generator to the coil heats and expands the pressurized gas 61.

The propellant expulsion system 60 is particularly adapted for larger space craft systems requiring two stages of operation. In the first stage, the first expulsion tank 22' is sized to have a volume blow down sufficient to expel the liquid propellant 12 from the primer tank 64. The volume of liquid propellant 12 in the primer tank 64 is sized such that the liquid propellant tank 30 remains partially filled following depressurization of the first expulsion tank 22'. The second expulsion tank 24 contains a volume of pressurized gas sufficient to empty the liquid oxidizer tank 42. Bi-propellant operation is used to power the space ship into orbit. The remaining liquid propellant 12 is then metered through valve 74 into the combustion chamber 76 of a steering engine 78. Since the liquid propellant thrust required to steer the orbiting space craft is less than that needed to achieve orbit, the second stage operation 12 is preferably as a mono-propellant system. The mono-propellant is decomposed to exhaust gases by reaction with catalyst 80.

Figure 6:
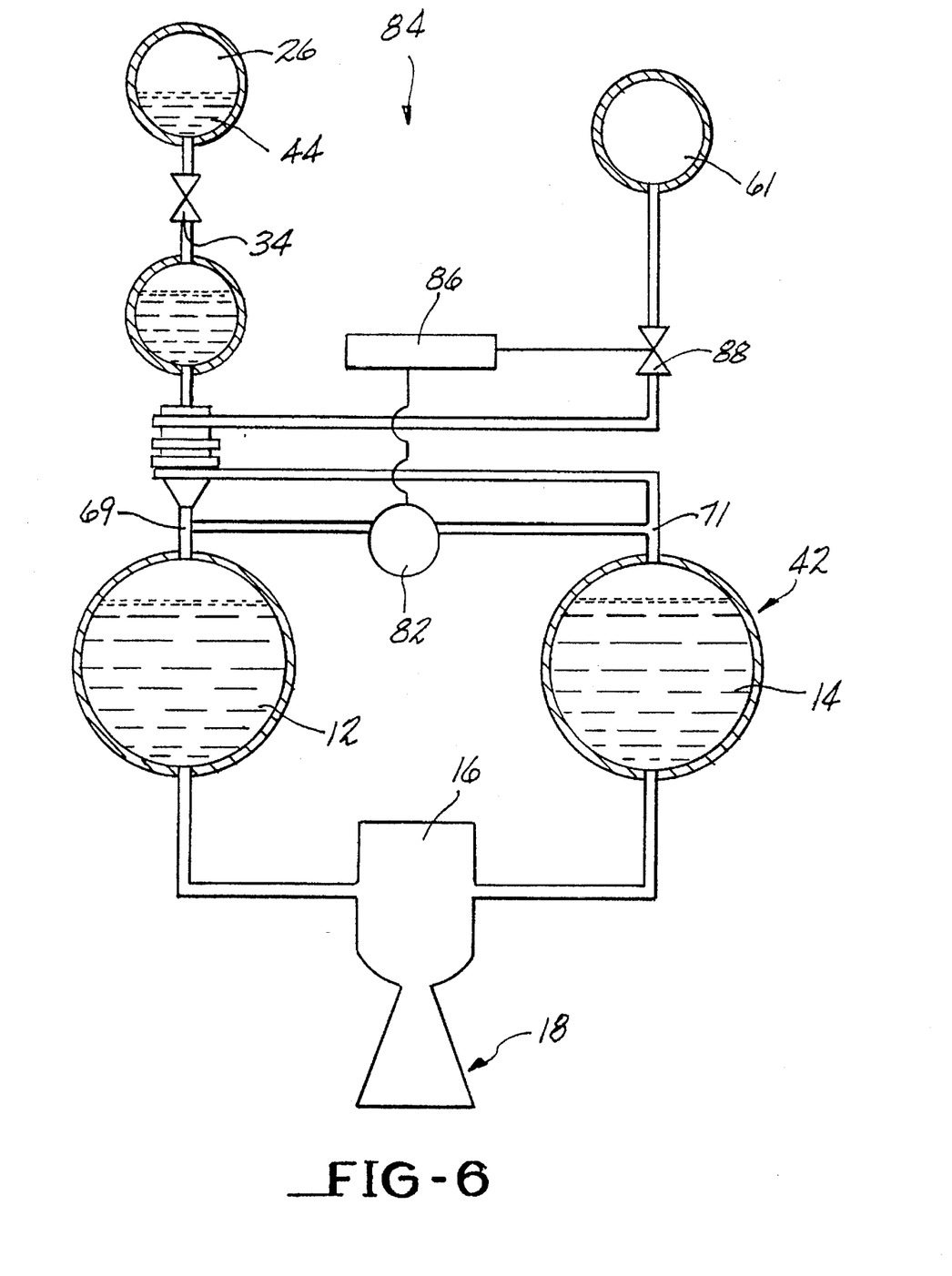
FIG. 6 shows in block diagram a liquid fuel component expulsion system in which the oxidizer flow rate is a function of the pressure under which the liquid propellant is delivered to a combustion chamber in accordance with the present invention.

FIG. 6 shows in block diagram the use of the ammonia vapor pressure as a control system to reduce the number of electromechanical controls required. The pressure generated by the compressed high vapor pressure liquid 44 is constant for a given ambient temperature. It is therefore possible to operate the propellant side as a near unity blow down reactor completely without controls. Valve 34 is a pyrotechnic, normally closed, valve which is explosively opened to initiate acceleration of the rocket engine 18. The reference pressure, the pressure of the first pressurized gas 26, as measured at conduit 69 is compared to the pressure of the second pressurized gas 61 at conduit 71. A sensor 82, such as a differential pressure switch, measures the pressure difference between the first 26 and second 61 pressurized gases. The sensor 82 communicates electrically with electronic controller 86 which in turn actuates electromechanical valve 88. The dynamic control of the electromechanical valve 88 ensures that the liquid propellant 12 to liquid oxidizer 14 mixture ratio is maintained at an optimum level.

Figure 7:
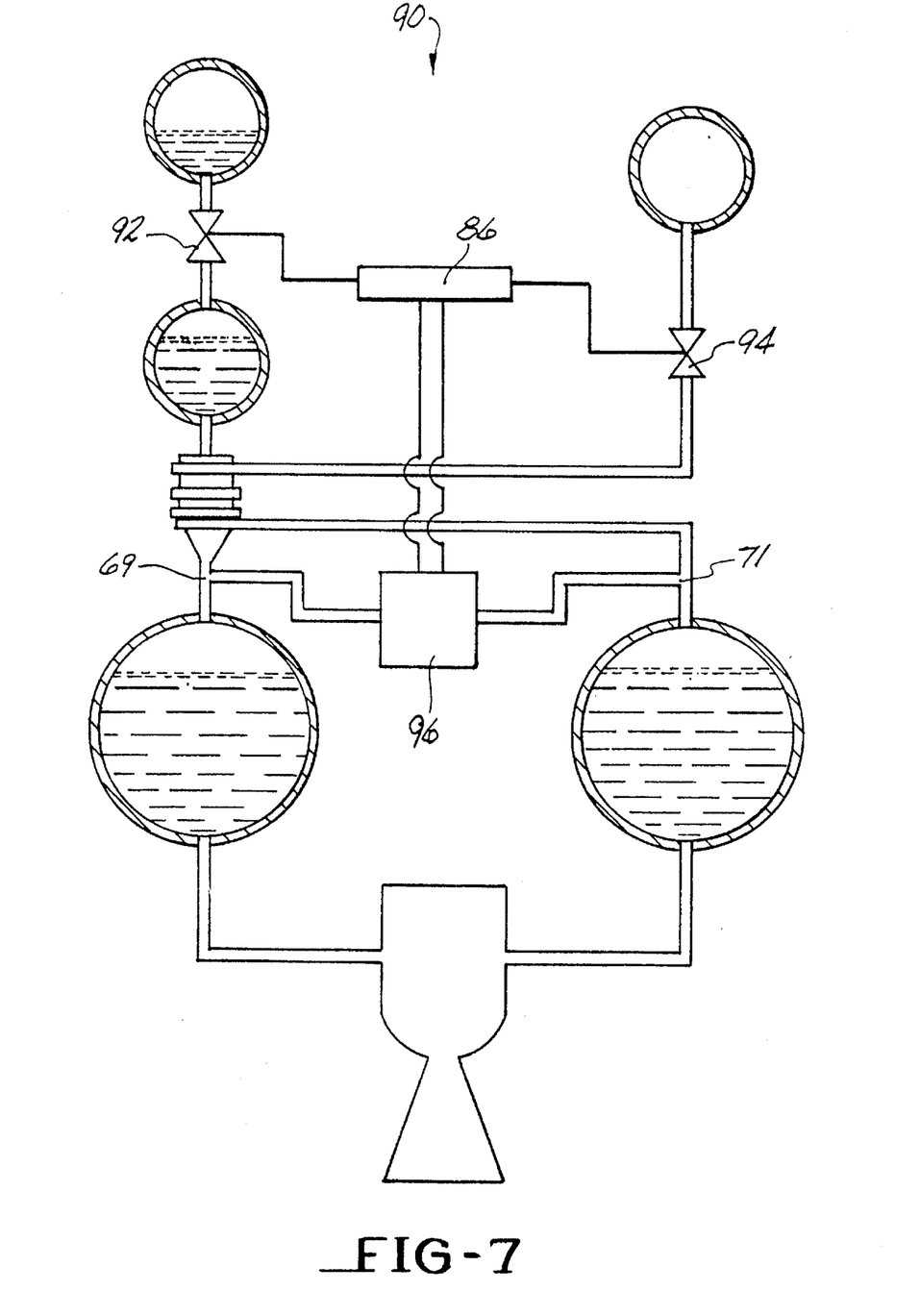
FIG. 7 shows in block diagram a liquid fuel component expulsion system in which the liquid propellant and liquid oxidizer flow rates are independently controlled using a high vapor pressure liquid as a reference.

FIG. 7 illustrates another embodiment of a propellant expulsion system 90. The propellant supply valve 92 and oxidizer supply valve 94 are independently controlled by controller 86. A differential pressure switch 96 compares the pressure at conduits 69 and 71 to a fixed reference gas pressure and electrically communicates with controller 86 which then adjusts the propellant supply valve 92 and oxidizer supply valve 94.

Figure 8:
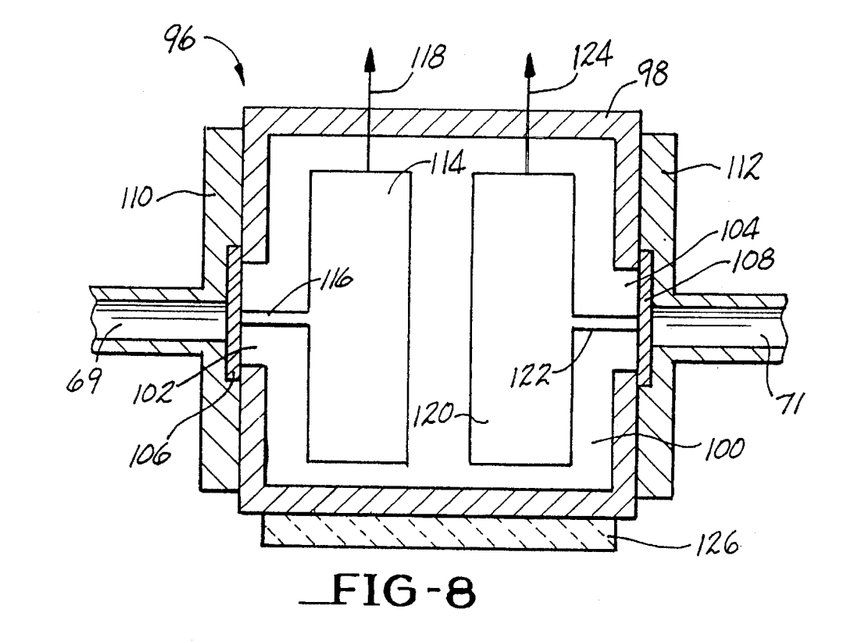
FIG. 8 shows in cross-sectional representation the control mechanism of FIG. 7.

FIG. 8 shows in cross-sectional representation the differential pressure switch 96. The pressure switch 96 includes a rigid metallic housing 98 which is sufficiently thick to resist flexing when the differential pressure switch cavity 100 is pressurized to approximately 100–200 psia. The housing 98 is manufactured from a material which is essentially non-reactive with the gas used to fill the cavity 100. In preferred embodiments, the cavity 100 is filled with the vapor phase of a high vapor pressure liquid such as ammonia vapor and the housing is 0.1 inch stainless steel. A first aperture 102 and a second aperture 104 are formed in the housing 98 and sealed with a first 106 and second a 108 diaphragm, respectively. The diaphragms 106, 108 a are selected to be repetitively responsive to very small pressure differentials and are substantially non-reactive with the gas used to pressurized the cavity 100. The reference gas is in communication with the internal surface of the first 106 and second 108 diaphragms. Preferably, the first 106 and second 108 diaphragm are formed from a thin metallic sheet such as 0.005 inch thick stainless steel. First 110 and second 112 flanges hermetically join conduits 69 and 71 to the first 106 and second 108 diaphragms respectively. The first pressurized gas is in communication with the exterior surface of the first diaphragm 106 by means of the conduit 69. The second pressurized gas is in communication with the exterior surface of the second diaphragm 108 by means of the conduit 71.

A first microswitch 114 has a first mechanical sensor 116 which just contacts the first diaphragm 106 in the null position and is responsive to flexing of the diaphragm. When a pressure differential exists between the conduit 69 and the pressurized gas in cavity 100, the diaphragm 106 flexes. The flex is detected by the first mechanical sensor 116 and communicated to the first microswitch 114 which electrically communicates the change in pressure through wire 118 to the controller (not shown). The second microswitch 120 and second mechanical sensor 122 similarly communicate deflections in the second diaphragm 108 through wire 124 to the controller for control of the oxidizer side of the propellant expulsion system.

The cavity 100 contains a volume of the reference gas which is sufficient to fill the cavity with the gas at a specific temperature. If the temperature is then raised above the initial value, no high vapor pressure liquid is present to increase the vapor pressure corresponding to the new temperature. As a result, the pressure vs temperature profile will follow the gas laws. The pressure of the reference gas within cavity 100 will be proportional to the absolute temperature. Preferred gases to fill the cavity 100 are fluorinated hydrocarbons, ammonia and mixtures thereof. Ammonia is the most preferred. A temperature controller 126 heats or cools the reference gas to provide the desired reference pressure.

While FIG. 8 illustrates a differential pressure switch 96 useful to evaluate two separate pressurized gases, a sensor responsive to the pressure of a single gas may incorporate only a single diaphragm, conduit and micro switch.

Figure 9:
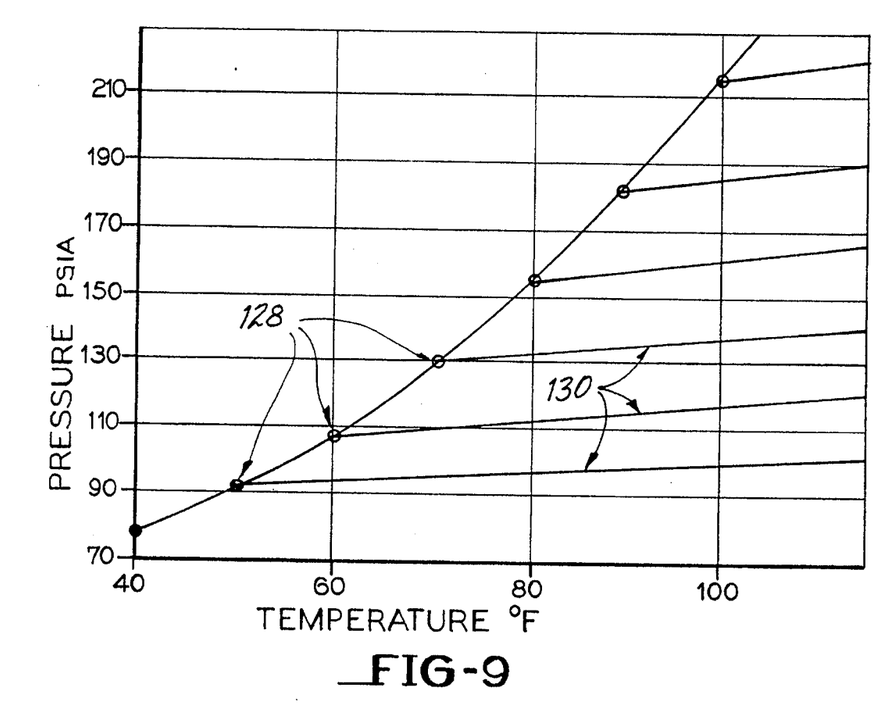
FIG. 9 graphically illustrates the pressure of ammonia vapor in a closed reference chamber as a function of temperature.

FIG. 9 graphically illustrates the ratio of vapor pressure to temperature for ammonia at the equilibrium point when sealed in the cavity 100 of the differential pressure switch 96 at the temperatures indicated by reference points 128. When the differential pressure switch 96 is sealed at the temperature indicated by the "X" axis and the pressure indicated by the "Y" axis, the gas pressure will change in response to a subsequent temperature increase linearly as indicated by reference lines 130. The differential pressure switch 96 utilizing the gas pressure laws as illustrated by FIG. 9 provides a low dead band (less than 1 psi) between the internal reference pressure and the external pressure to be controlled.

Figure 10:
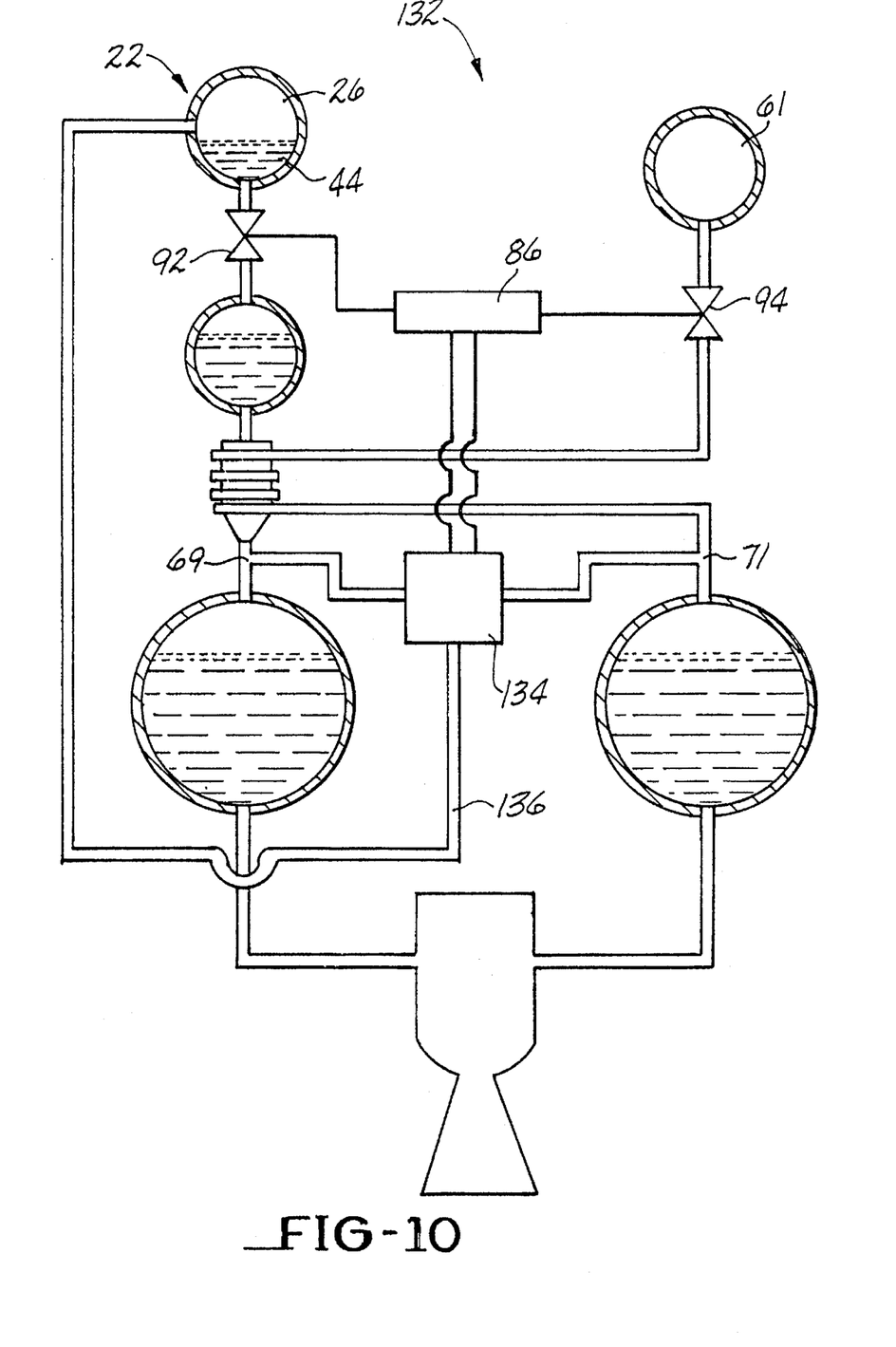
FIG. 10 shows in block diagram a liquid fuel component expulsion system in which the liquid propellant and liquid oxidizer flow rates are independently controlled by a control system utilizing as a reference the constant pressure of the liquid propellant expulsion tank.

FIG. 10 illustrates in block diagram another embodiment of a propellant expulsion system 132. As with the embodiment of FIG. 7, a differential pressure switch 134 independently senses the pressure differences in conduits 69 and 71 and electronically communicates the pressure values to a controller 86. The controller 86 then independently controls electromechanical propellant supply 92 and oxidizer supply 94 valves. Rather than the reference pressure being dictated by a reference gas sealed within the housing of the differential pressure switch 134, conduit 136 exploits the constant pressure of the vapor phase of a high vapor pressure liquid in the first expulsion tank 22. If the pressure at an initial temperature is known, then the reference pressure for a given temperature can be determined from the gas laws. Alternatively, the second pressurized gas 61 is utilized if the second expulsion system is selected to include the vapor phase of a high vapor phase liquid in the gas law condition.

Figure 11:
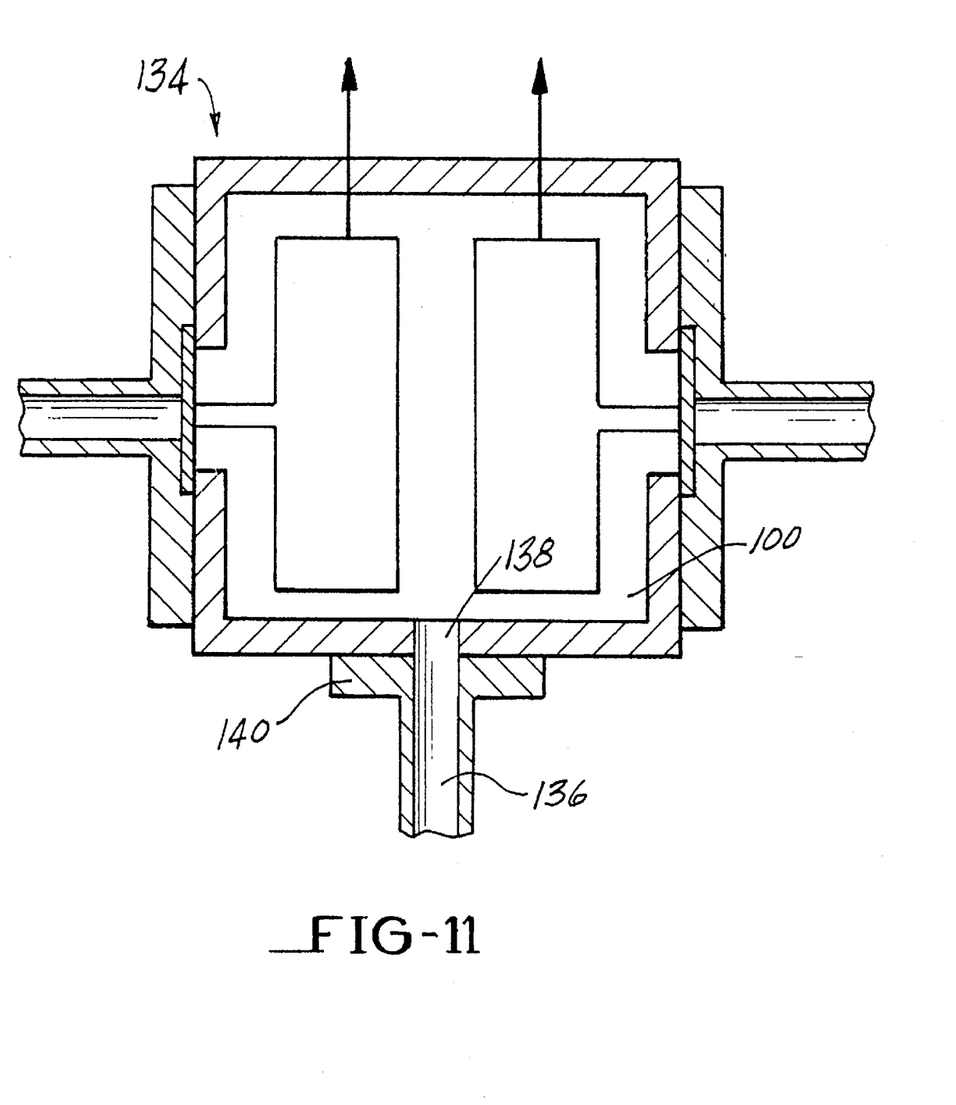
FIG. 11 shows in cross-sectional representation the control mechanism of FIG. 10.

FIG. 11 illustrates in cross-sectional representation the differential pressure switch 134 of FIG. 10. The differential pressure switch 134 is substantially the same as the switch 96 of FIG. 8, with the addition of a third aperture 138 which communicates the pressure of the first expulsion tank by means of conduit 136 to cavity 100. Third flange 140 ensures that the pressure within the cavity 100 is equal to the pressure communicated through conduit 136. Heaters and thermostats are not required since control of the reference pressure is maintained in the first expulsion tank.

Figure 12:
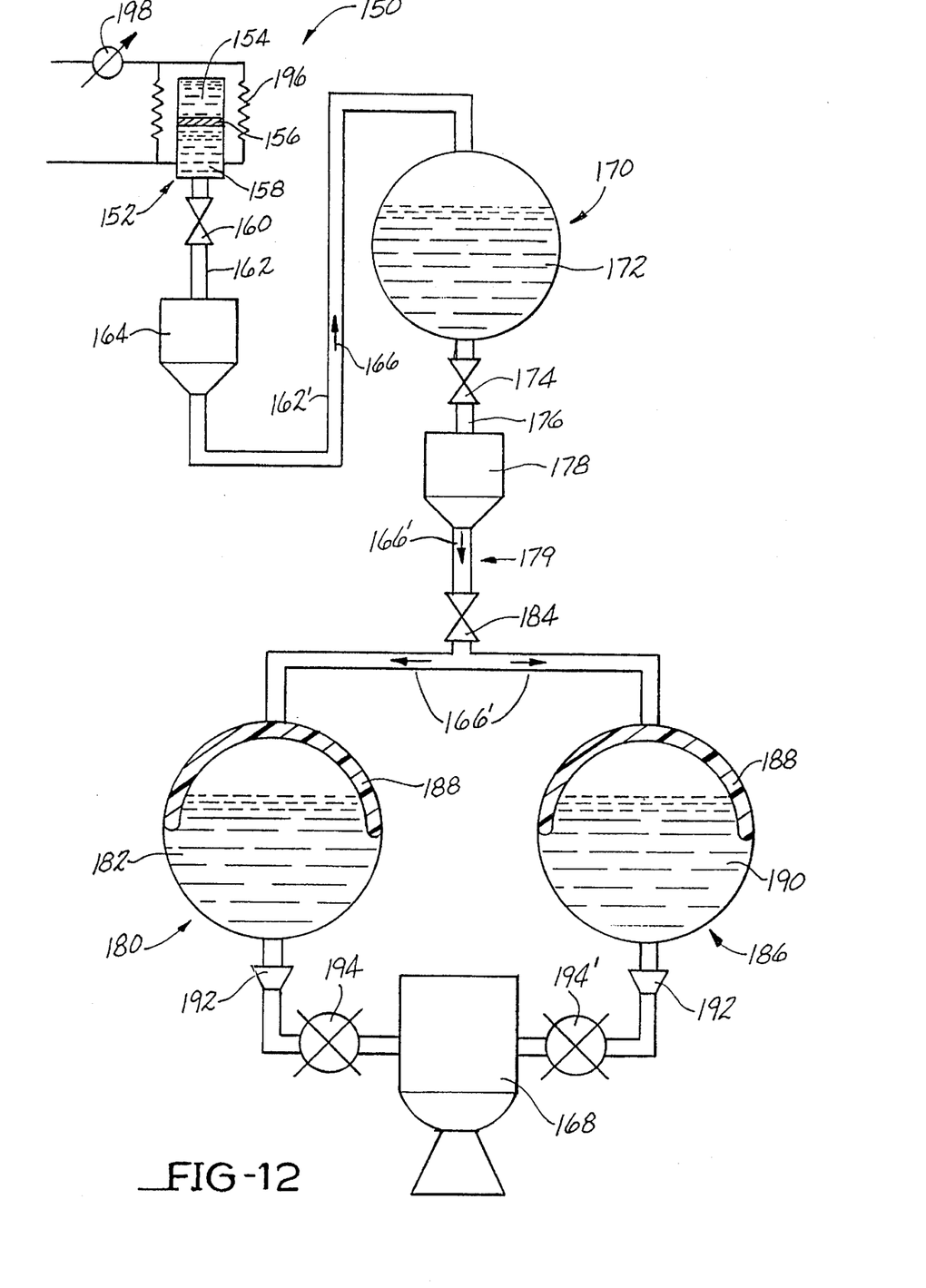
FIG. 12 shows in block diagram a two stage pressurization system for a bi-propellent fuel in accordance with the invention.

FIG. 12 illustrates in block diagram, a two stage system 150 for delivering a liquid propellant to a combustion reactor utilizing the concepts of the invention.

The system 150 incorporates a near unity blowdown reactor (or "NUBR"). As described above in connection with FIGS. 3 and 4, the blowdown ratio (B) is:

$$B = \frac{\text{Total pressure available to empty tank}}{\text{Equilibrium pressure}} \quad (1)$$

As the blowdown ratio approaches unity, a larger sized vessel is required to store the fluid that displaces a first stage liquid propellant.

In the system 150, a first vessel 152 contains a fluid 154 maintained at a first pressure. The fluid 154 is a high vapor pressure liquid such as ammonia, helium or a mixture thereof. The first vessel is pressurized to above the vapor phase equilibrium point of the fluid 154 so a portion of the fluid is condensed liquid and a portion is a gas.

The first vessel 152 may be filled only with the fluid 154, but preferably, includes a first displaceable partition 156 such as a diaphragm or a piston. The first displaceable partition is responsive to changes in the volume of the fluid 154 expelling a liquid propellant 158 from the first vessel 152.

The liquid propellant 158 is released by opening a first valve 160. The first valve 160 is preferably pyrotechnically opened, although other valve mechanisms such as a burst disc or a solenoid may be utilized. Since the system pressure control is passive, the first valve has no function after initially being opened to fire the rocket engine.

The liquid propellant is delivered by a first conduit 162 to a first gas generator 164. Alternatively, the first vessel 152 may contain a high vapor pressure liquid and be configured to expel the pressurized gas 166 directly. In this embodiment, the first gas generator 164 is not required. The rate of flow of the liquid propellant 158 to the first gas generator 164 is determined by the back pressure applied by the pressurized gas 166. As the back pressure is reduced, when fuel is being supplied to a combustion reactor 168, the rate of liquid propellant 158 entering the first gas generator 164 increases. When the back pressure increases, when the thrust of the combustion reactor 168 is no longer required and the fuel supply is stopped, the rate of liquid propellant entering the first gas generator 164 decreases until an equilibrium is achieved between the pressure exerted by the first fluid and the back pressure.

At this equilibrium pressure minimal to no liquid propellant 158 enters the first gas generator 164. Any gas generated at equilibrium, such as by diffusion of the liquid propellant 158 into the first gas generator 164 is contained within the system.

The pressurized gas 166 continues through the first conduit 162' and is delivered to a second vessel 170. The second vessel 170 contains a gas forming liquid 172 such as hydrazine. A second valve 174 in a second conduit 176 releases the displaced gas forming liquid 172 to a second gas generator 178. The second valve 174 is preferably pyrotechnic, but may be any suitable valve type as described above for the first valve 160. As with the first valve, the second is not required once the engine is initially fired.

A pressurized gas 166 generated by the second gas generator is delivered through a third conduit 179 to a third vessel 180 containing a propellant 182 such as hydrazine or kerosine. A third valve 184, such as a burst valve, releases the pressurized gas 166' at ignition and then serves no additional function.

Figure 14:
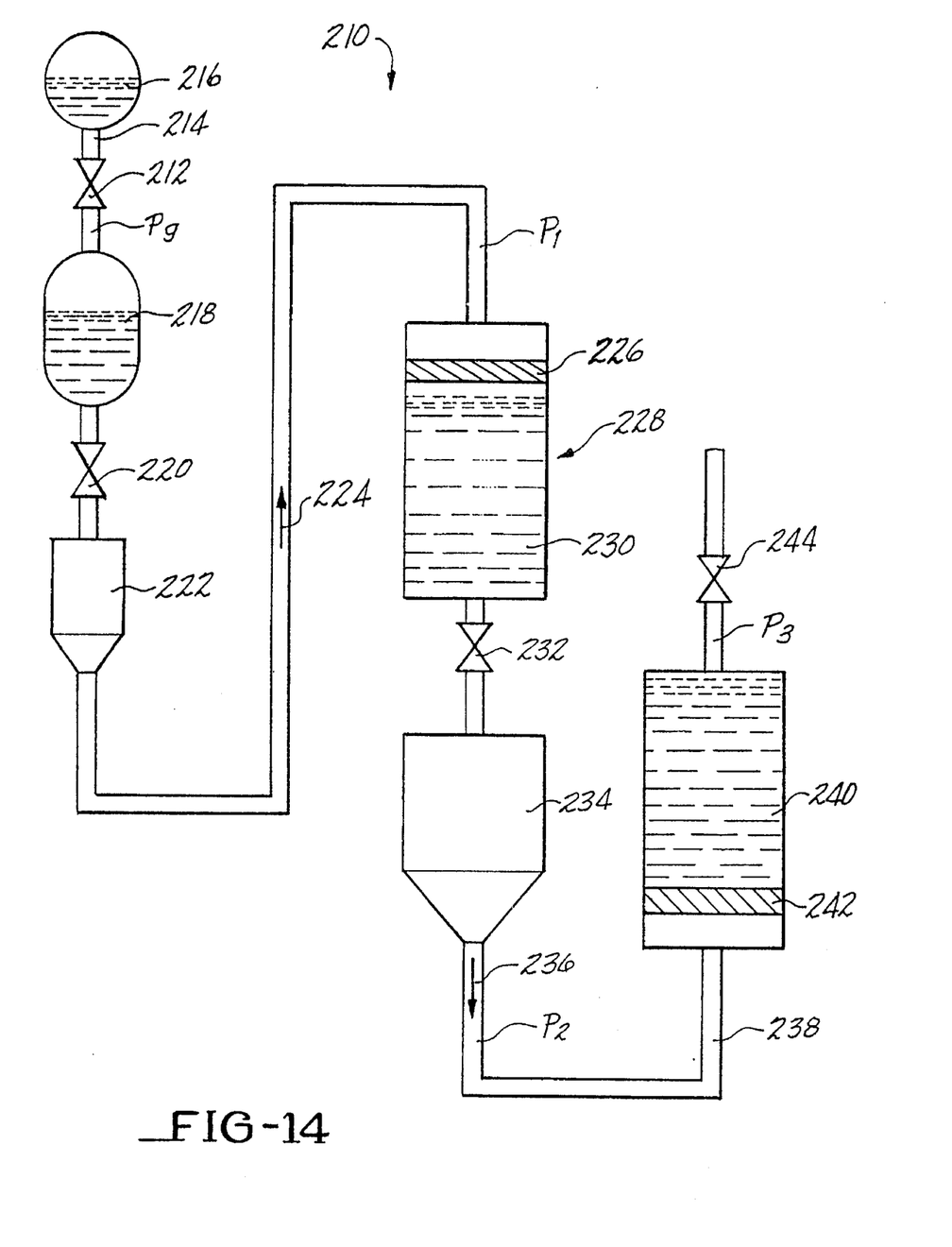
FIG. 14 shows in block diagram a two stage pressurization system for a monopropellent fuel used to generate pressure data in an Example.

The system, as illustrated in FIG. 12, may have a bipropellant main fuel system with the combination of a propellant tank 180 and an oxidizer tank 186. The system is amendable to monopropellant main fuel systems as illustrated in FIG. 14.

Referring back to FIG. 12, the pressurized gas 166' applies pressure against a diaphragm 188 to expel a desired quantity of propellant 182, such as hydrazine or kerosine and oxidizer 190 such as nitrogen tetroxide. The propellant 182 and oxidizer 190 combine in the combustion chamber 168 providing a desired thrust.

Figure 13:
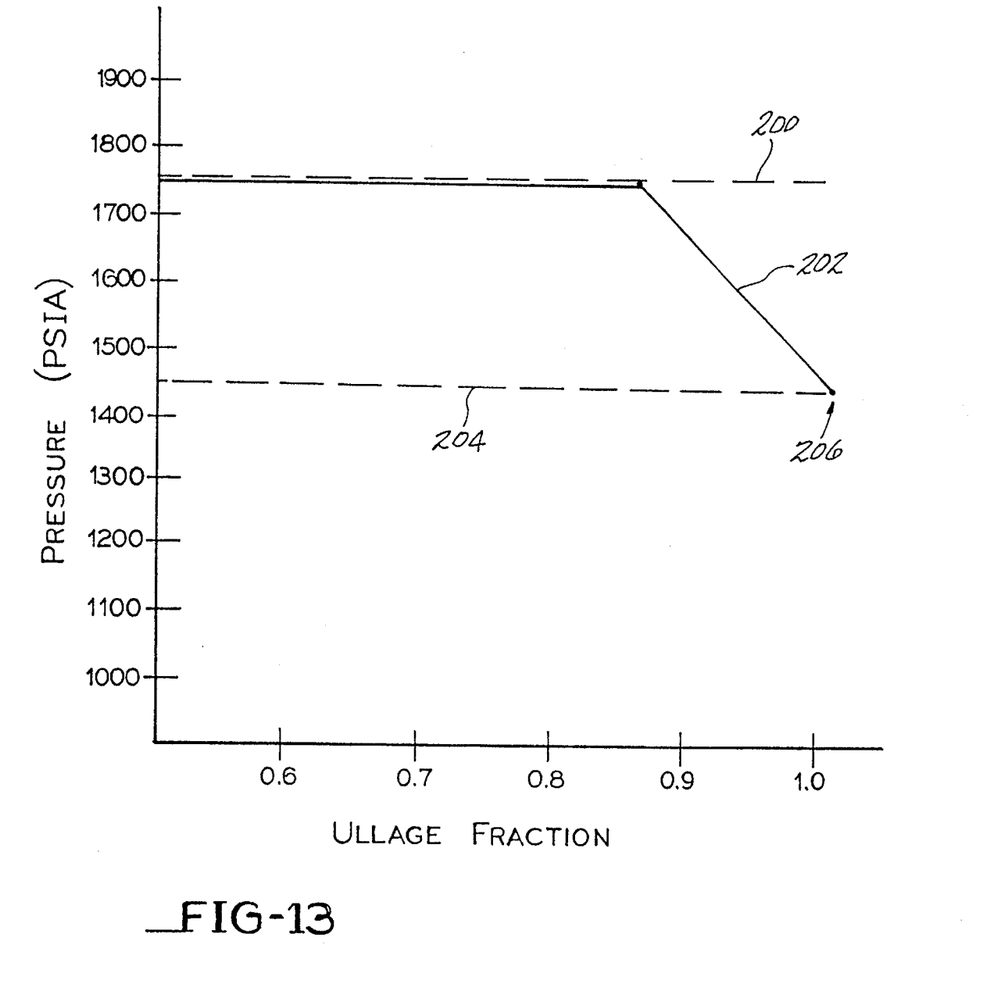
FIG. 13 graphically illustrates the pressure provided by a compressed liquid/gas mixture as a function of the containment vessel ullage.

The diaphragm 188 is any flexible material that is not degraded by contact with the propellant, oxidizer of downstream pressurized gas. Suitable materials include rubber, plastics and metals. Alternatively, a piston may replace the diaphragm as illustrated in FIGS. 2 and 13.

Check valves 192 prevent backflow and possible cross contamination when the pressurized gas 166'0 ceases to apply a positive pressure on the diaphragms 188.

A controller 194, 194' is the only active device necessary to operate the system 150. When the controller 194 is open, liquid propellant 182 flows from the third vessel 180 creating a vacuum behind the diaphragm 188. The pressurized gas 166' flows to fill this vacuum, causing additional gas forming liquid 172 to flow from the second vessel 170. The depletion of gas forming liquid 172 is accommodated by the flow of pressurized gas 166 resulting in the upstream expulsion of the liquid propellant 158.

When the controller is closed, the pressure throughout the system 150 achieves equilibrium and flow of the pressurized gases 166, 166' essentially stops.

The operating temperature of the system is from the freezing point of the liquid propellent 158 contained within the pressurized gas source 152 up to maximum temperature at which the other system components can function safely. When the liquid propellent is hydrazine, the minimum operating temperature is about 34° F. and the maximum safe operating temperature is about 200° F. By forming a mixture of water, hydrazine and hydrazine nitrate, the minimum operating temperature is depressed to −65° F.

To maximize fluid expulsion from the first vessel 152, the fluid is heated, preferably to a temperature within about 20° F. of the maximum safe operating temperature. An electrical resistance heater 192 controlled by a thermostat 194 is effective to provide the desired heat to the pressurized gas source 152.

The pressure limits of the pressurized gas are governed by the system pressure requirements. The blowdown ratio of the fluid 154 is then tailored (by the initial pressure, liquid volume, temperature, and composition) to provide a pressure within this range. Typically, the pressure limits are from about 500 psia to about 2000 psia and preferably in the range of from about 1400 psia to about 1800 psia.

As illustrated graphically in FIG. 13, the pressure applied by the fluid 154 is generally constant, and preferably at approximately the maximum safe operating pressure as indicated by broken reference line 200, during most of the operational life of the system. As the ullage of the first vessel approaches 85%, the fluid pressure, indicated by reference line 202, begins to drop linearly as a function of the ullage. Extrapolating to a ullage fraction of 1, when the tank is empty, the blowdown ratio is selected so that the fluid pressure 202 exceeds the minimum operational pressure limit of the system, indicated by broken reference line 204, at point 206.

The system 150 has a weight advantage over conventional pressurized gas systems. The pressurized fluid 154 is stored as a high density liquid at relatively low pressure and is converted into a gas by reducing the system pressure. With the inclusion of resistance heater 196, fluid 154 utilization is near 100% unlike cold gas systems that leave residual gas in the storage vessel at the end of the system's useful life.

The amount of fluid 154 required to expel a desired volume of gas forming liquid 172 is much less than the volume of a pressurized gas required to expel the same desired volume of gas forming liquid. The storage volume of the system 150 is reduced allowing more fuel to be carried by the spacecraft or a lighter weight fuel delivery system.

A concern in all high thrust systems is "water hammer" vibrations throughout the system due to oscillations in the gas pressure. In the present invention, the number of controllers and valves is reduced and the first vessel 152 is in close proximity to the second stage 170. As a result, system frequency response is enhanced and the magnitude of pressure oscillations reduced.

The advantages of the invention are illustrated in the Example that follows. The Example is exemplary and not intended to limit the scope of the claims.

EXAMPLE

A constant pressure monopropellant fuel expulsion system 210 as illustrated in FIG. 14 was equipped with a plurality of gas pressure sensors ($P_g$, $P_1$, $P_2$ and $P_3$). The system was test fired for 50 seconds and the pressure recorded.

The test fire was initiated by electromechanically opening a first valve 212 opening a first conduit 214 between a pressurization source (helium) 216 and a first stage fuel supply 218. The first stage fuel supply 218 contained a liquid monopropellent (hydrazine) that was expelled through a second valve 220. The liquid propellant flowed into a first gas generator 222 and is converted to a pressurized gas 224.

The pressurized gas 224 forced a piston 226 located in the main stage fuel tank 228 expelling a liquid monopropellent 230 (hydrazine) rupturing a third burst valve 232. The liquid monopropellent flowed into a second stage gas generator 234 and was converted into a pressurized propellant gas 236.

The pressurized propellant gas 236 would ordinarily be directed through the conduit 238 to a main fuel tank, however, for the purpose of the Example, was directed to a gas accumulator 240 driving a second piston 242 simulating a main fuel or oxidizer tank. A controller 244 controlled the expulsion of water simulating thruster operation and was the only active control in the system. The pressure throughout the system passively adjusted to changes in the system pressure as illustrated in FIG. 15.

Figure 15:
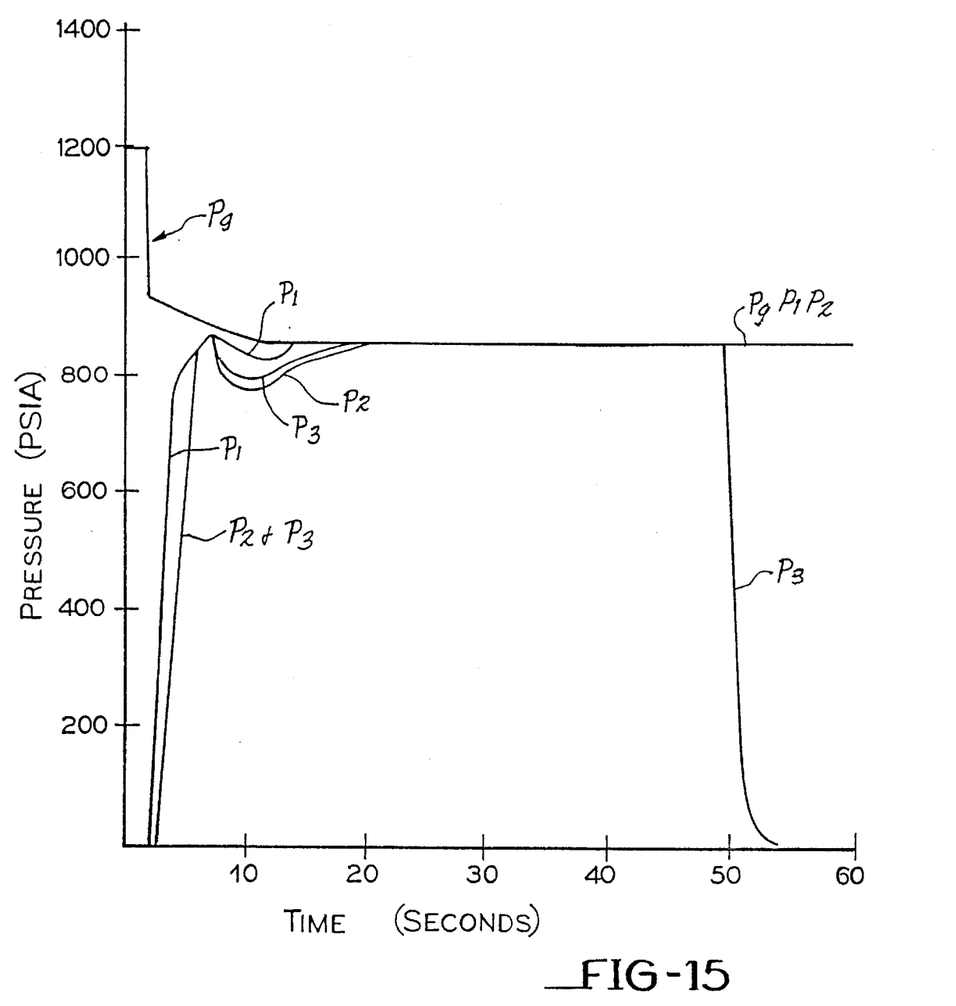
FIG. 15 graphically illustrates the pressure data generated by the system of FIG. 14 during a test firing.

In FIG. 15, the pressures recorded by $P_g$, $P_1$, $P_2$ and $P_3$ were recorded as a function of the time following ignition. $P_g$ is initially at a high pressure as the inert gas expels liquid propellent from the first stage fuel supply. At equilibrium, achieved after about 15 seconds, the back pressure against the inert gas source equals the pressure at the source.

$P_1$, the pressure generated by the first stage fuel supply drives the piston to expel the fuel from the main fuel tank. The pressure $P_1$ increased for about the first 7 seconds as pressure is applied to the piston driving the main fuel tank. As fuel is expelled from the main fuel tank, the pressures $P_2$ and $P_3$ increase as the pressure $P_1$ decays approximately 10–15 seconds following ignition. Once equilibrium is reached, after about 15 second, $P_g$, $P_1$ and $P_2$ passively follow the pressure $P_3$ as governed by the controller.

The rapid decay at $P_3$ after about 50 seconds is a test anomaly. When the piston reached the end of its travel, a delay in closing the controller 244 released the pressure downstream of the piston.

While the invention has been described in terms of bi-propellant expulsion systems, it is equally applicable to mono-propellant expulsion systems.

The patents set forth in this application are incorporated by reference herein.

It is apparent that there has been provided in accordance with this invention a means to expel a liquid fuel from a storage tank to a rocket engine and to control the rate of that expulsion which fully satisfies the objects, features and advantages set forth hereinabove. While the invention has been described in combination with the embodiments thereof, it is evident that many alternatives, modifications and variations will be apparent to those skilled in the art in light of the foregoing description. Accordingly, it is intended to embrace all such alternative modifications and variations as fall within the spirit and broad scope of the appended claims.

I claim:

1. A two-stage system for delivering a liquid propellant to a combustion reactor, comprising:
   a first vessel containing a mixture of a high vapor pressure liquid and the vapor of that liquid maintained at a pressure of from about 500 psia to about 2000 psia;
   a second vessel containing a gas forming liquid;
   a third vessel containing a liquid propellent;
   a first conduit for delivering said high vapor pressure liquid to said second vessel and displacing at least a portion of said gas forming liquid;
   a second conduit for delivering said gas forming liquid to a gas generator generating a pressurized gas;
   a third conduit for delivering said pressurized gas to said third vessel and displacing at least a portion of said liquid propellent; and
   a controller downstream of said third vessel for controllably releasing said liquid propellent.

2. The system of claim 1 wherein said mixture is selected from the group consisting of ammonia, helium and mixtures thereof.

3. The system of claim 1 wherein said first vessel is heated to a temperature between the freezing point of said high vapor pressure liquid and about 20° F. below the boiling temperature of said high vapor pressure liquid.

4. A two-stage system for delivering a liquid propellant to a combusting reactor, comprising:
   a first vessel containing a fluid that is a mixture of a high vapor pressure liquid and the vapor of that liquid maintained at a first pressure and further containing a first liquid propellant separated from said mixture by a displaceable member;
   a second vessel containing a gas forming liquid;
   a third vessel containing a second liquid propellant;
   a first conduit for delivering said fluid to said second vessel and displacing at least a portion of said gas forming liquid;
   a second conduit for delivering said gas forming liquid to a gas generator generating a pressurized gas;
   a third conduit for delivering said pressurized gas to said third vessel and displacing at least a portion of said liquid propellant and
   a controller downstream of said third vessel for controllably releasing said liquid propellant.

5. The system of claim 4 wherein said first vessel is heated to a temperature between the freezing point of said first liquid propellant and about 20° F. below the boiling temperature of said first liquid propellant.

6. The system of claim 5 wherein said first liquid propellent is hydrazine and the contents of said first vessel are heated to a temperature of from about 34° F. to about 200° F.

7. The system of claim 5 wherein said first liquid propellent is a mixture of hydrazine, hydrazine nitrate and water and the contents of said first vessel are heated to a temperature of from about −65° F. to about 200° F.

8. The system of claim 7 wherein the first pressure is from about 500 psia to about 2000 psia.

9. The system of claim 8 wherein the first pressure is from about 1400 psia to about 1800 psia.

10. The system of claim 7 wherein said gas forming liquid is hydrazine.

11. The system of claim 10 wherein said second liquid propellent is a monopropellent.

12. The system of claim 11 wherein said second liquid propellent is hydrazine.

13. The system of claim 10 wherein said second liquid propellent is a bipropellent component and said third conduit also delivers said pressurized gas to a fourth vessel containing an oxidizer.

14. The system of claim 13 wherein said bipropellent component is hydrazine and said oxidizer is nitrogen tetroxide.

15. The system of claim 4 wherein said mixture is selected from the group consisting of ammonia, helium and mixtures thereof.

* * * * *